(No Model.)

W. WARD.
COOKING UTENSIL.

No. 410,620. Patented Sept. 10, 1889.

WITNESSES:
T. Hopson
Samuel Boyd

INVENTOR
WHITFIELD WARD.
BY Francis C. Bowen
ATTORNEY

N. PETERS. Photo-Lithographer, Washington, D. C.

UNITED STATES PATENT OFFICE.

WHITFIELD WARD, OF NEW YORK, N. Y.

COOKING UTENSIL.

SPECIFICATION forming part of Letters Patent No. 410,620, dated September 10, 1889.

Application filed May 17, 1889. Serial No. 311,128. (No model.)

*To all whom it may concern:*

Be it known that I, WHITFIELD WARD, a citizen of the United States, and a resident of New York, in the county of New York and State of New York, have invented certain new and useful Improvements in Cooking Utensils, of which the following is a specification.

My invention relates especially to that class of cooking-vessels which are to be used in connection with an ordinary gas-burner; and it consists of certain novel features of construction, hereinafter fully described, for producing a vessel with an effective heating-surface of comparatively large area.

Figure 1:
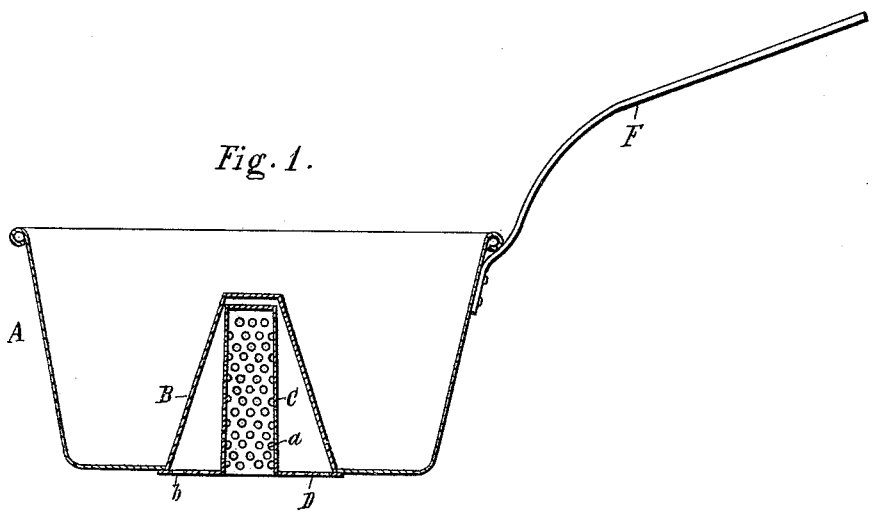
Figure 2:
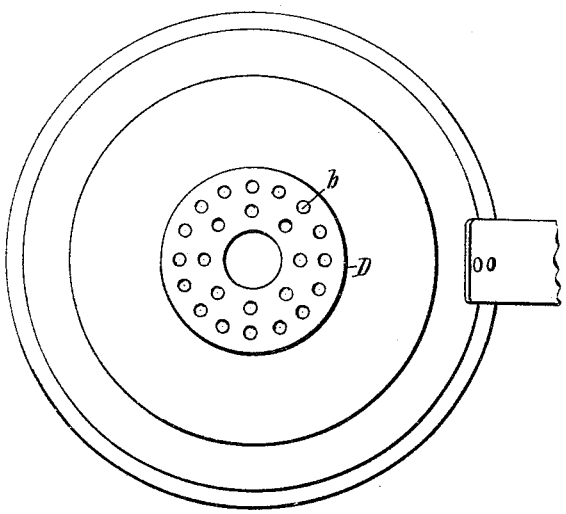

In the accompanying drawings, Figure 1 represents a vertical central section of a cooking-vessel embodying my invention. Fig. 2 represents an inverted plan view thereof.

Similar letters of reference indicate corresponding parts.

The letter A indicates the body of the vessel, having a central opening in the bottom thereof, in which opening is secured a conical hood B, rising in said vessel to a point near its upper edge. Within said conical hood B is a cylindrical hood C, which is perforated, as at *a*, in distinction from the conical hood, which is left solid, and which cylindrical hood is secured in a ring D, which also is perforated, as at *b*, and in turn is secured to the bottom of the vessel, said ring being between the two hoods.

When the vessel is applied to use, the gas-burner is introduced into the inner or cylindrical hood C, causing the latter to act as a support for the entire vessel by resting upon the usual shoulder of the burner, and if the gas is then lighted the flame passes through the holes of the inner hood against the inner surface of the outer hood, thence downward through the holes of the ring D, and thence outward along the bottom of the vessel, thereby exposing the substance in the vessel to a very effective heat by a comparatively small flame.

What I claim as new, and desire to secure by Letters Patent, is—

A cooking-vessel combining a conical hood B, a cylindrical perforated hood within said conical hood, and a perforated ring D between said hoods, substantially as and for the purpose described.

WHITFIELD WARD.

Witnesses:
 FRANCIS C. BOWEN,
 JAS. S. EUBANK.